United States Patent
Senner et al.

(10) Patent No.: US 6,921,601 B2
(45) Date of Patent: Jul. 26, 2005

(54) FUEL CELL STACK HUMIDIFICATION METHOD INCORPORATING AN ACCUMULATION DEVICE

(75) Inventors: Ralf Senner, Wiesbaden (DE); Rittmar Von Helmolt, Mainz (DE)

(73) Assignee: General Motors Corporation, Detroit, MI (US)

(*) Notice: Subject to any disclaimer, the term of this patent is extended or adjusted under 35 U.S.C. 154(b) by 158 days.

(21) Appl. No.: 10/439,588

(22) Filed: May 16, 2003

(65) Prior Publication Data

US 2004/0229087 A1 Nov. 18, 2004

(51) Int. Cl.[7] ............................. H01M 8/02; H01M 8/04
(52) U.S. Cl. ............................. 429/34; 429/22; 429/39
(58) Field of Search ........................... 429/12, 13, 22, 429/34, 39

(56) References Cited

U.S. PATENT DOCUMENTS

| | | | | |
|---|---|---|---|---|
| 3,775,186 A | * | 11/1973 | Cheron ........................... 429/20 |
| 3,811,951 A | * | 5/1974 | Stedman ......................... 429/25 |
| 5,441,821 A | * | 8/1995 | Merritt et al. ................... 429/17 |
| 6,670,067 B2 | * | 12/2003 | Sato et al. ....................... 429/34 |
| 2002/0136942 A1 | * | 9/2002 | Kashiwagi ..................... 429/34 |
| 2003/0148166 A1 | * | 8/2003 | DeJohn et al. ................. 429/34 |
| 2004/0096721 A1 | * | 5/2004 | Ohlsen et al. ................. 429/34 |

FOREIGN PATENT DOCUMENTS

| | | | | |
|---|---|---|---|---|
| JP | 09213353 A | * | 8/1997 | ............ H01M/8/04 |
| JP | 2001266922 A | * | 9/2001 | ............ H01M/8/06 |
| WO | WO 99/28985 A1 | | 5/1999 | |

* cited by examiner

Primary Examiner—Gregg Cantelmo
(74) Attorney, Agent, or Firm—Harness, Dickey & Pierce, P.L.C.

(57) ABSTRACT

A method of fuel cell stack humidification is provided incorporating the use of an accumulation device. The method provides for feeding back humid anode exhaust gas of the fuel cell stack to the fuel cell inlet and switching the anode inlet and outlet of the fuel cell stack for achieving better homogeneity of humidity along the fuel cell channels.

5 Claims, 3 Drawing Sheets

FUEL CELL STACK HUMIDIFICATION METHOD INCORPORATING AN ACCUMULATION DEVICE

FIELD OF THE INVENTION

The present invention relates to fuel cell systems, and more particularly to a fuel cell stack humidification method incorporating an accumulation device.

BACKGROUND OF THE INVENTION

The membranes of PEM fuel cells must be kept in humid conditions in order to achieve high performance and durability. Therefore, if operated at elevated temperatures, fuel cell systems usually require a humidification device for the feed gases air and/or hydrogen. It has been shown that the fuel gas, which is fed to the anode of the fuel cell stack, requires humidification in order to prevent the fuel cell stack from drying at the fuel inlet. Along the internal channels of the fuel cell stack, there is an increase in water content that causes a humidity gradient in the electrolyte membrane, and inhomogeneous power distribution. The inhomogeneous power distribution might lead to hot spots in some areas, and to excessive water accumulation in other areas, which again has a negative affect on performance and durability. Furthermore, humidification devices have several disadvantages, especially for automotive applications of the fuel cell stack, as they are heavy, expensive, and sometimes, due to the water they contain, subject to freezing at low ambient temperatures.

Previous solutions of the humidification problem involved membrane humidifiers and water injection methods, as well as humid gas recirculation. Recirculation methods take advantage of the fact that gases at the fuel cell outlets are humidified with the water produced in the fuel cell, and can be fed back at the fuel cell inlet in order to bring the humidity there without having liquid water involved. A disadvantage is the need for a recirculation pump, the power consumption of the pump and the humidity gradient in a stack along the channel. Also, the switching of oxidizing feed gas between cathode gas inlets and outlets of the fuel cell was proposed in WO/9928985A1. The advantage provided by that system is the better homogeneity of humidity in the fuel cell as the dry feed gas is alternating in one and the other direction in the channel. The feed gas, however, is suggested to be the oxidant, and is dry, which might lead to performance degradation at both gas inlets. Accordingly, it is desirable in the art to provide a method of providing homogeneous membrane humidification without having liquid water involved in the process and without requiring additional pumps or the use of additional power.

SUMMARY OF THE INVENTION

The present invention provides a fuel cell stack humidification method incorporating an accumulation device. The method of the present invention provides for feeding back humid anode exhaust gas of the fuel cell stack to the fuel cell inlet and switching the anode inlet and outlet of the fuel cell stack for achieving better homogeneity of humidity along the fuel cell channels. The method includes operating a fuel cell stack having two openings which are each capable of serving as a fuel gas inlet and a fuel gas outlet. Fuel is supplied to one of the two openings. Exiting fuel gas from the other of the two openings is stored and the supply of fuel gas is then switched to the other of the at least two openings so that the original outlet is now serving as the fuel gas inlet and the original fuel gas inlet is now serving as the outlet. The stored exiting humid fuel gas is then introduced into the fresh supply of fuel gas going to the new inlet opening so that the stored humid exiting fuel gas can be used to humidify the PEM membrane.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With reference to FIGS. 1–5, several embodiments of the present invention will now be described. A common method between the described systems is that humid fuel gas that exits the fuel cell stack is collected in a device during one cycle of the process. Then, the flow direction of the anode gas is reversed and the stored humid gas is fed back to the former gas outlet which has become the gas inlet. The other gas inlet, which, in the second cycle, becomes the outlet, is connected to another gas storage device, which is then filled with humid exhaust gas which will be stored and then delivered to the inlet during the next cycle.

Figure 1:
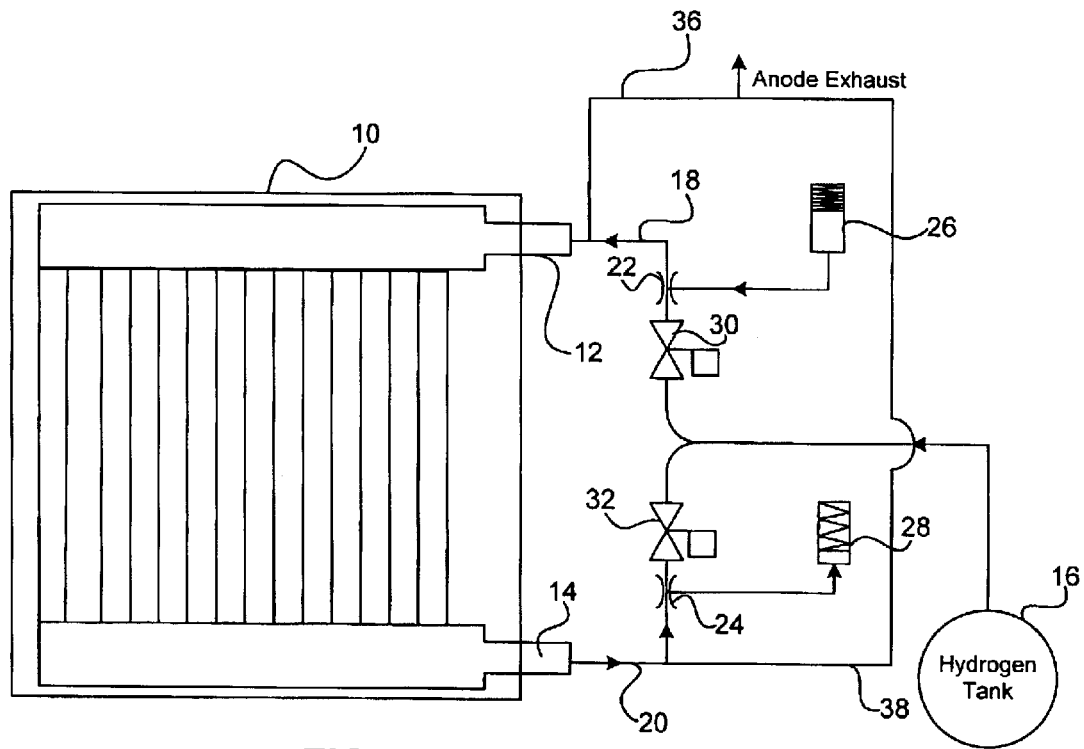
FIG. 1 is a schematic view of a fuel cell stack having alternating anode gas inlet and outlet passages with two expansion reservoirs according to the principles of the present invention.

With reference to FIG. 1, a first embodiment of the present invention will now be described. As shown in FIG. 1, a fuel cell stack 10 is provided including a first opening 12 and second opening 14 which each serve as inlet and outlet openings for the anode gas. A hydrogen tank 16 is provided in connection with passages 18, 20 which are connected to respective anode gas openings 12, 14. Each of the passages 18, 20 is provided with a venturi tube 22, 24 which are each provided in fluid communication with a respective expansion reservoir 26, 28. A valve system is provided including a first flow control valve 30 provided in the first passage 18 and a second flow control valve 32 provided in the second passage 20. The first passage 18 is also connected to a first exhaust passage 36. The second passage 20 is connected to a second exhaust passage 38. The exhaust gas in the first and second exhaust passages 36, 38 is handled by an exhaust system which can, for example, provide a constant gas stream to the environment or to the cathode, or may provide a pulsed gas stream to the environment or to the cathode which is controlled by the system.

During a first cycle of operation, the first flow control valve 30 is in an open condition and the second flow control valve 32 is in a closed position so that hydrogen from hydrogen tank 16 flows through the first passage 18 to supply hydrogen to the fuel cell stack 10 via the first opening 12. The hydrogen gas passes through the fuel cell stack 10 and is exhausted through the second opening 14 where it is directed to the second passage 20. As the exhaust anode gas passes by the venturi tube 24, the expansion reservoir 28 is provided with humid exhaust anode gas via the venturi tube 24.

During a second cycle of operation, the flow control system is switched so that the flow control valve 32 is opened and the flow control valve 30 is closed to cause hydrogen flow from hydrogen tank 16 through second passage 20 and into the fuel cell stack 10 via the second opening 14 which now serves as the fuel cell inlet 14. As the hydrogen flows past the venturi tube 24, the stored humid exhaust anode gas within the expansion reservoir 28 is sucked into and mixed with the fresh hydrogen gas which is delivered to the fuel cell stack 10. As the anode exhaust now exits through the first opening 12, serving as the outlet, humid exhaust anode gas is extracted from the passage 18 by the venturi tube 22 and stored in the first expansion reservoir 26. The flow control system is then switched again so that the first flow control valve 30 is opened and the second flow control valve 32 is closed to cause hydrogen from the hydrogen tank 16 to flow through the passage 18 into the first opening 12 which now is serving as the fuel cell stack 10 inlet. The stored humid anode exhaust gas is then reintroduced into the fresh hydrogen provided in the first flow passage 18.

This two-cycle system is continued so that humid exhaust gas is continually reintroduced into the inlet of the fuel cell stack 10 while the inlet is alternated between the first and second openings 12, 14. By alternating the inlets and reintroducing humid exhaust anode gas, the present invention provides higher humidity homogeneity in the fuel cell stack which has a positive impact on the cell performance and durability.

Figure 5:
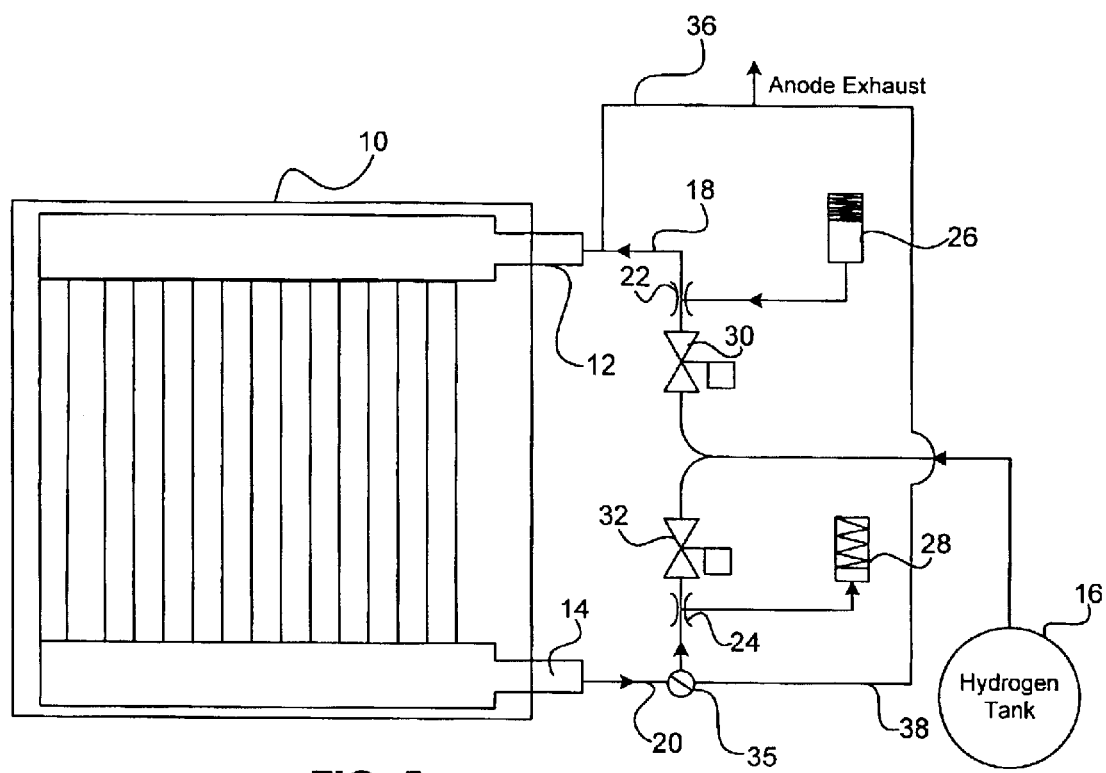
FIG. 5 is a schematic diagram of the system of FIG. 1 with a water separator added.

Liquid water may occur within the anode gas stream. Too much liquid water could have a negative impact on the operation of the fuel cell system. To drain the liquid water, a water separator 35 could be integrated into the anode system, as illustrated in FIG. 5. It should be understood that each of the embodiments of the present invention may employ a water separator as shown.

Figure 2:
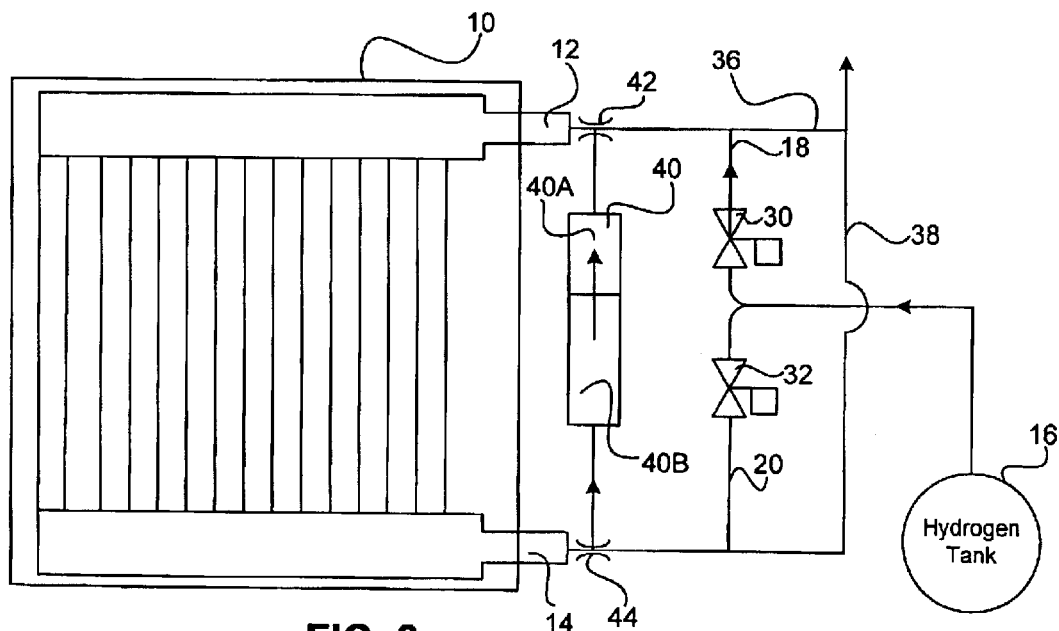
FIG. 2 is a schematic view of a fuel cell stack having alternating anode gas inlet and outlet passages with a single expansion reservoir.

With reference to FIG. 2, an alternative arrangement of the fuel cell stack humidification system will now be described wherein common reference numerals are utilized to identify common elements as described with reference to FIG. 1. The fuel cell stack 10 is again provided with first and second openings 12, 14, which each serve as inlet and outlet openings for the anode gas of the fuel cell stack 10. The hydrogen tank 16 is provided in fluid communication with first and second passages 18, 20 which are in communication with the first and second openings 12, 14, respectively. A flow control system is provided including a first flow control valve 30 disposed in the first passage 18 and a second flow control valve 32 disposed in the second passage 20.

The embodiment of FIG. 2 differs from the embodiment of FIG. 1 in that a single expansion reservoir 40 is provided in communication with first and second venturi tubes 42, 44 provided in the first passage 18 and second passage 20, respectively. The expansion reservoir 40 has two chambers 40A, 40B which each communicate with a respective venturi tube 42, 44.

During operation, the fuel cell system is operated in a first cycle by opening the first flow control valve 30 and closing a second flow control valve 32 so that hydrogen flows from hydrogen tank 16 to passage 18 into the first opening 12 which serves as an inlet during the first cycle. Humid exhaust anode gas exits the fuel cell stack 10 through the opening 14 which is functioning as the outlet and through passage 38. The humid anode exhaust gas passes through venturi 44 which siphons off humid exhaust gas to fill chamber 40B of the single expansion reservoir 40. During a second cycle, the flow control valve 30 is closed and the flow control valve 32 is opened so that hydrogen is supplied from hydrogen tank 16 through passage 20 to opening 14 which now serves as the fuel cell stack 10 inlet port. The humid exhaust gas stored in storage chamber 40B of expansion reservoir 40 is reintroduced into the fresh hydrogen supply passing through passage 20 and into the fuel cell stack 10. Humid anode exhaust gas exits the fuel cell stack 10 through opening 12 which now serves as the outlet in connection with passage 36 and some of the exhaust anode gas is diverted by the venturi tube 42 into the first chamber 40A of the expansion reservoir 40. The stored humid anode exhaust gas in the chamber 40A is later used when the opening 12 is serving as the fuel cell stack anode gas inlet.

Figure 3:
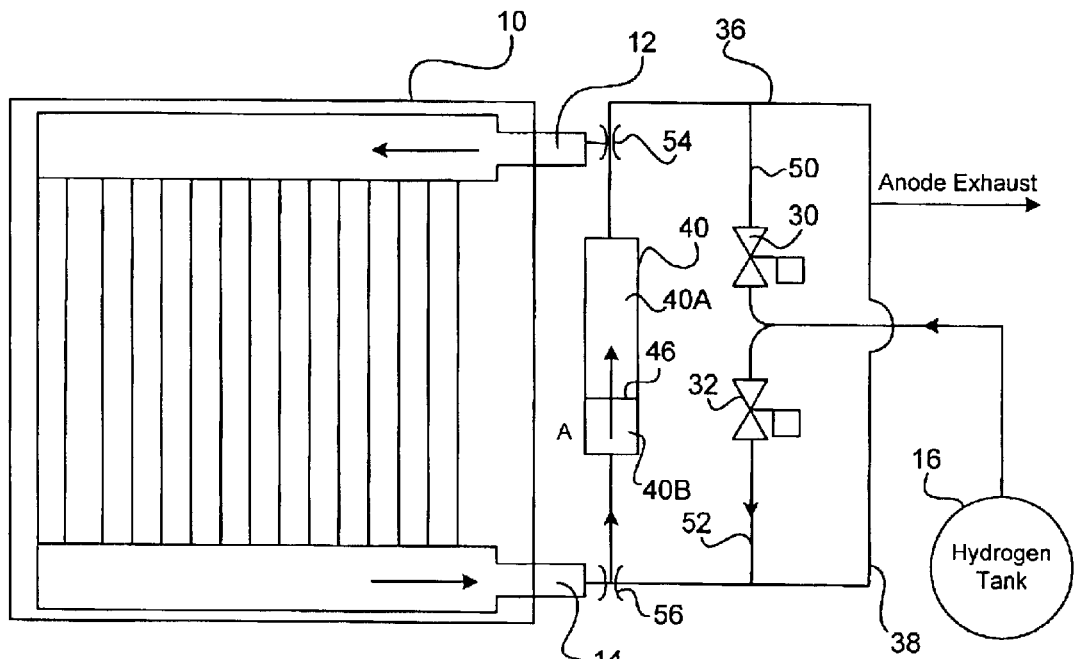
FIG. 3 is a schematic view of a fuel cell stack having alternating anode gas inlet and outlet passages with a single expansion reservoir for premixing the exhaust anode gas with fresh hydrogen according to the principles of the present invention.

With reference to FIG. 3, a fuel cell stack 10 is provided with a first opening 12 and a second opening 14 which each serve as an inlet and an outlet for the anode gas provided to the fuel cell stack 10. A hydrogen tank 16 provides hydrogen to the fuel cell stack 10. A first passage 50 and a second passage 52 are connected to the hydrogen tank 16 and in connection with an expansion reservoir 40. The expansion reservoir 40 includes a first chamber 40A and a second chamber 40B which are in fluid communication with the first passage 50 and second passage 52, respectively. In this embodiment, the exhaust gas and the fresh hydrogen is first mixed in the expansion reservoir 40 before the mixture enters the fuel cell stack 10. A venturi tube 54 is in communication with the first passage 50 for providing mixed exhaust gas and hydrogen to the first opening 12 and a second venturi tube 56 is provided in communication with the second passage 52 for providing mixed exhaust gas and hydrogen to the second opening 14 of the fuel cell stack 10.

During operation, the first chamber 40A of the expansion reservoir 40 is filled with mixed exhaust gas and hydrogen while fresh hydrogen is supplied through passage 52 through the open flow control valve 32 while flow control valve 30 is in a closed position. The introduction of fresh hydrogen into chamber 40B of expansion reservoir 40 forces the piston 46 of the expansion reservoir 40 to move in the direction of arrow A forcing the stored mixture of hydrogen and exhaust gas through opening 12 which now serves as the inlet of the fuel cell stack 10. The passage of hydrogen through passage 52 causes the exhaust gas exiting the opening 14 which is serving as the outlet port in connection with passage 38 to be mixed with the fresh hydrogen through venturi tube 56 which is then supplied to chamber 40B of expansion reservoir 40. The inlet and outlet are then reversed by closing flow control valve 32 and opening flow control valve 30 which directs the hydrogen from hydrogen tank 16 through passage 50 and into chamber 40A of expansion reservoir 40. The introduction of hydrogen into the expansion chamber 40A causes piston 46 to move downward opposite the direction of arrow A forcing stored hydrogen and humid exhaust gas out of chamber 40B and into the opening 14 which is now serving as the fuel cell stack inlet. As the hydrogen gas goes through passage 50, it is mixed with exhaust gas via the venturi tube 54 and then enters chamber 40A of expansion reservoir 40. This cycle is repeated continuously in order to provide higher humidity and homogeneity in the fuel cell stack 10.

Figure 4:
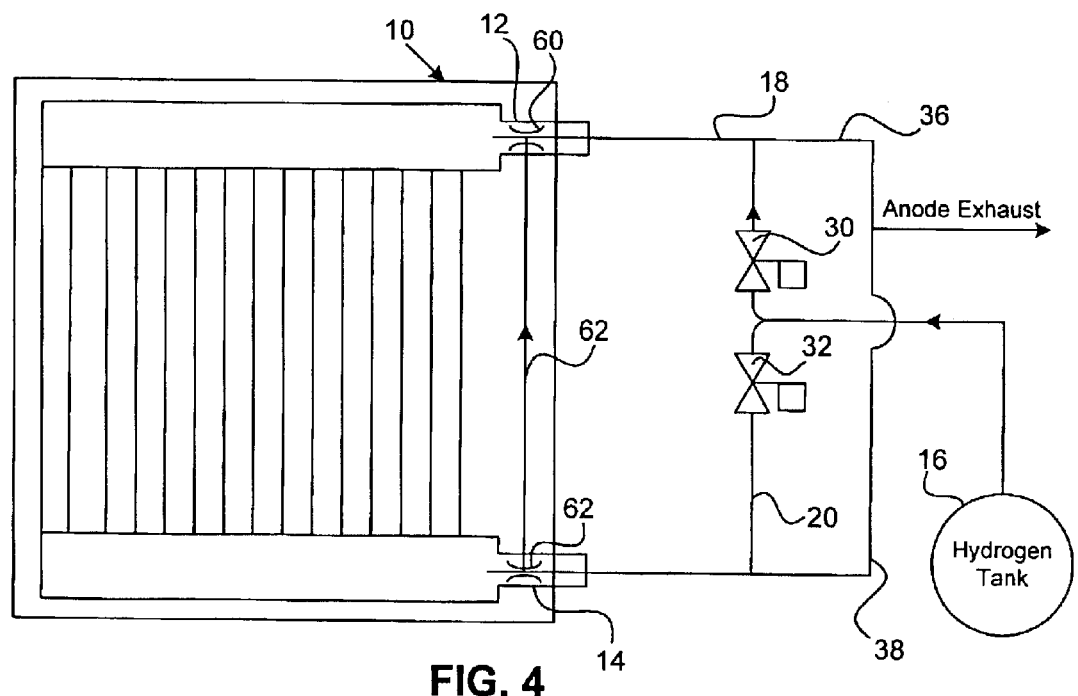
FIG. 4 is a schematic diagram of a fuel cell stack having alternating anode gas inlet and outlet passages with recycled anode exhaust according to the principles of the present invention.

With reference to FIG. 4, the fuel cell stack 10 is provided with an opening 12 and an opening 14 which are each capable of serving as an inlet and an outlet for the anode gas of the fuel cell stack 10. A hydrogen tank 16 is provided for supplying hydrogen to the fuel cell stack anode passage. A first passage 18 is connected between the hydrogen tank 16 and first opening 12, and a second passage 20 is provided between the hydrogen tank 16 and second opening 14 of the fuel cell stack 10. A first flow control valve 30 is provided in the first passage 18 and a second flow control valve 32 is provided in the second passage 20. A venturi tube 60, 62 is provided in each of the openings 12, 14. A recycle passage 64 is in communication with the venturi tubes 60, 62.

During operation, hydrogen is provided from hydrogen tank 16 through the first opening 12 of the fuel cell stack 10 which is serving as the anode gas inlet. The flow control valve 30 is in an open position and the flow control valve 32 is in a closed position so that hydrogen flows through passage 18. The opening 14 is serving as the outlet along with passage 38 for the humid exhaust anode gas of the fuel cell stack 10. As the humid exhaust gas passes through venturi tube 62 provided in the second opening 14, the humid exhaust gas is drawn through the recycle passage 64 to the first venturi tube 60 provided in the inlet 12 of the fuel cell stack 10. The humid exhaust anode gas is mixed with fresh hydrogen from passage 18 and is delivered to the fuel cell stack 10. In a second step of the cycle, the flow control valve 30 is closed and the flow control valve 32 is opened to supply hydrogen through passage 20 to opening 14 which now serves as the fuel cell stack inlet. The opening 12 then serves as the fuel cell stack anode gas outlet and exhaust gas passing through venturi tube 60 is drawn through recycle passage 64 to the inlet port 14 for mixing the humid exhaust anode gas with fresh hydrogen.

The systems disclosed provide higher humidity homogeneity in the fuel cell, thus having a positive impact on fuel cell performance and durability. The pressure in the hydrogen tank 16 is used as an energy source so no additional electrical power for hydrogen recirculation and no recirculation pump is needed. The result is a higher system efficiency and lower cost at the same time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
   a fuel cell stack having at least two openings for fuel gas inlet and outlet;
   a fuel gas supply having a first passage connected to a first one of said at least two openings and a second passage connected to a second one of said at least two openings;
   a first expansion reservoir in fluid communication with said first one of said at least two openings;
   a second expansion reservoir in fluid communication with said second one of said at least two openings;
   a control valve system being selectively operable in a first position for directing said fuel gas supply to said first one of said at least two openings, and operable in a second position for directing said fuel gas supply to said second one of said at least two openings.

2. The fuel cell system according to claim 1, wherein said first and second expansion reservoirs are in fluid communication with a venturi tube disposed in said first and second passages, respectively.

3. A fuel cell system, comprising:
   a fuel cell stack having at least two openings for fuel gas inlet and outlet;
   a fuel gas supply having a first passage connected to a first one of said at least two openings and a second passage connected to a second one of said at least two openings;
   an expansion reservoir defining two chambers, each chamber in fluid communication with a respective one of said at least two openings;
   a control valve system selectively operable in a first position for directing said fuel gas supply to said first one of said at least two openings, and operable in a second position for directing said fuel gas supply to said second one of said at least two openings.

4. The fuel cell system according to claim 3, wherein said two chambers of said expansion reservoir are in fluid communication with a venturi tube disposed in said first and second passages, respectively.

5. A fuel cell system, comprising:
   a fuel cell stack having at least two openings for fuel gas inlet and outlet;
   a fuel gas supply having a first passage connected to a first one of said at least two openings and a second passage connected to a second one of said at least two openings;
   a venturi tube provided in said at least two openings;
   a recirculation passage connected between said venturi tubes in said at least two openings; and
   a control valve system being selectively operable in a first position for directing said fuel gas supply to said first one of said at least two openings, and operable in a second position for directing said fuel gas supply to said second one of said at least two openings.

* * * * *